(12) United States Patent
Cohen et al.

(10) Patent No.: US 8,020,589 B2
(45) Date of Patent: Sep. 20, 2011

(54) HYDROGEN DISPENSING STATION AND METHOD OF OPERATING THE SAME

(75) Inventors: Joseph Perry Cohen, Bethlehem, PA (US); Tama Maya Copeman, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1295 days.

(21) Appl. No.: 11/649,649

(22) Filed: Jan. 4, 2007

(65) Prior Publication Data

US 2008/0185068 A1   Aug. 7, 2008

(51) Int. Cl.
  *B65B 1/30* (2006.01)
  *F17C 7/02* (2006.01)
(52) U.S. Cl. .......... 141/95; 141/4; 141/82; 141/83; 141/94; 141/234; 62/50.1
(58) Field of Classification Search .......... 141/9, 82, 141/83, 94, 95, 104, 105, 197, 234, 237; 62/49.1–50.5
See application file for complete search history.

(56) References Cited

U.S. PATENT DOCUMENTS

| | | | |
|---|---|---|---|
| 3,719,196 A | 3/1973 | McJones | |
| 5,259,424 A * | 11/1993 | Miller et al. | 141/4 |
| 5,479,966 A | 1/1996 | Tison et al. | |
| 5,538,051 A | 7/1996 | Brown et al. | |
| 5,551,490 A | 9/1996 | Kountz et al. | |
| 5,771,948 A | 6/1998 | Kountz et al. | |
| 6,619,336 B2 | 9/2003 | Cohen et al. | |
| 6,779,568 B2 * | 8/2004 | Borck | 141/67 |
| 6,786,245 B1 | 9/2004 | Eichelberger et al. | |
| 6,810,925 B2 | 11/2004 | Graham et al. | |
| 7,028,724 B2 * | 4/2006 | Cohen et al. | 141/94 |
| 7,059,364 B2 * | 6/2006 | Kountz et al. | 141/4 |
| 7,168,464 B2 * | 1/2007 | Diggins | 141/105 |
| 7,328,726 B2 * | 2/2008 | Cohen et al. | 141/9 |
| 7,568,507 B2 * | 8/2009 | Farese et al. | 141/95 |
| 2005/0056661 A1 | 3/2005 | Casamatta et al. | |
| 2007/0079892 A1 * | 4/2007 | Cohen et al. | 141/105 |
| 2008/0000542 A1 * | 1/2008 | Cohen et al. | 141/18 |

FOREIGN PATENT DOCUMENTS

| | | |
|---|---|---|
| EP | 1 450 097 A2 | 8/2004 |
| EP | 1 452 794 A2 | 9/2004 |
| EP | 1 693 611 A2 | 8/2006 |
| WO | 96/22915 A1 | 8/1996 |
| WO | 2006/031365 A2 | 3/2006 |

OTHER PUBLICATIONS

U.S. Appl. No. 11/247,561, filed Oct. 10, 2005, Cohen, et al.
U.S. Appl. No. 11/352,041, filed Feb. 10, 2006, Cohen, et al.
Transit Cooperative Research Program (TCRP) Report 38 "Guidebook for Evaluating, Selecting, and Implementing Fuel Choices for Transit Bus Operations," Chapter 3, Compressed Natural Gas, pp. 11-24, Transportation Research Board, National Research Council, National Academy Press, Washington, D.C., 1998.

* cited by examiner

*Primary Examiner* — Timothy L Maust
(74) *Attorney, Agent, or Firm* — Bryan C. Hoke, Jr.

(57) ABSTRACT

A hydrogen dispensing station and method of operating a hydrogen dispensing station for dispensing to multiple receiving vessels. The station and method limit receiving vessel gas temperature during dispensing. Various components used to limit receiving vessel gas temperature during dispensing are mutual to multiple hydrogen service ports. Receiving vessel gas temperature during dispensing may be affected by pressure ramp rate control, cooling of hydrogen in a heat exchanger, and/or use of a lower temperature hydrogen source stream.

22 Claims, 9 Drawing Sheets

HYDROGEN DISPENSING STATION AND METHOD OF OPERATING THE SAME

BACKGROUND

The present invention is related to a hydrogen dispensing station and a method of operating a hydrogen dispensing station. More particularly, the present invention is directed to a hydrogen dispensing station and method useful for simultaneously dispensing hydrogen gas into at least two receiving vessels.

Because of the interrelationship between the temperature, pressure, and density of gases, the amount of hydrogen, $H_2$, that can safely be introduced into a receiving vessel, such as a vehicle storage tank, during refueling necessarily depends upon factors such as the volume, design pressure, and temperature of the receiving vessel, and the temperature and pressure of the compressed gas inside the tank. Industry convention sets the pressure rating for $H_2$ fuel tanks at the standard temperature of 15 degrees Celsius, so nominal pressure ratings such as 250 bar (25 MPa), 350 bar (35 MPa), 500 bar (50 MPa) and 700 bar (70 MPa), correspond to an internal gas temperature of 15 degrees Celsius.

During rapid refueling of hydrogen, the internal tank temperature will typically rise about 50 degrees Celsius due to adiabatic compression of the gas and the reverse Joule-Thompson effect. After the tank is filled, the temperature and pressure inside the tank will decrease as the gas cools, which may result in a less than complete fill. Wide variations in ambient temperature above or below the standard condition of 15 degrees Celsius can also have a significant effect on the indicated pressure inside the tank during and after refueling.

It is desirable to provide a complete fill. A complete fill is when the receiving vessel contains gas at its target pressure and target temperature after coming to equilibrium with its surroundings.

Since receiving vessels have temperature ratings, it may be desirable to limit the receiving vessel gas temperature during dispensing.

As referred to herein, a gas includes pressurized gas and supercritical fluids. A pressurized gas is a fluid below its critical pressure and below its critical temperature. A supercritical fluid is a fluid above either its critical pressure or its critical temperature.

When hydrogen is to be dispensed into multiple receiving vessels, dispensing may be done by a serial or a parallel approach. A serial approach would entail sequential dispensing to one receiving vessel at a time. A parallel approach would entail simultaneously dispensing to at least two receiving vessels.

Hydrogen dispensing by a serial approach is subject to delays and interruptions if issues arise with either the dispensing station or a receiving vessel. The maximum rate for dispensing to a receiving vessel, while at the same time maximizing the amount of hydrogen dispensed, is limited due to potential temperature rise of the receiving vessel gas temperature during dispensing.

Hydrogen dispensing by a parallel approach generally requires significantly more equipment to facilitate dispensing to multiple receiving vessels at the same time. Dispensing to multiple receiving vessels where the receiving vessels are constructed of different materials and are different sizes may pose additional challenges.

BRIEF SUMMARY

A hydrogen dispensing station is disclosed. The hydrogen dispensing station comprises at least two hydrogen service ports; a means for limiting receiving vessel gas temperature during dispensing, the means for limiting receiving gas temperature during dispensing in upstream fluid communication with the at least two hydrogen service ports; and a controller with at least one fast dispensing rate algorithm in electronic communication with the means for limiting receiving vessel gas temperature during dispensing, wherein the controller is capable of generating at least one of a pressure ramp rate control command and a temperature control command responsive to the at least one fast dispensing rate algorithm and the controller is capable of electronically communicating the at least one of a pressure ramp rate control command and a temperature control command to the means for limiting receiving vessel gas temperature during dispensing.

The means for limiting receiving vessel gas temperature during dispensing may be a programmable pressure control valve for receiving the pressure ramp rate control command.

The hydrogen dispensing station may further comprise at least three gas transmission lines having differing orifice coefficients for transmitting hydrogen gas at different flow rates therethrough and the means for limiting receiving vessel gas temperature during dispensing may be a valve array for selectively passing hydrogen gas through the at least three gas transmission lines responsive to the pressure ramp rate control command.

The means for limiting receiving vessel gas temperature during dispensing may be a coolant flow regulated heat exchanger for providing regulated indirect heat exchange responsive to the temperature control command.

The hydrogen dispensing station may further comprise a heat exchanger and the means for limiting receiving vessel gas temperature during dispensing may be a valve array for selectively passing hydrogen gas through the heat exchanger responsive to the temperature control command.

Additionally or alternatively, the hydrogen dispensing station may further comprise a first conduit containing hydrogen having a first temperature; a second conduit containing hydrogen having a second temperature different from the first temperature; and the means for limiting receiving vessel gas temperature during dispensing may be a valve array or multi-way valve in fluid communication with the first conduit and the second conduit, the valve array or multi-way valve for selectively passing hydrogen from the first conduit and hydrogen from the second conduit simultaneously to the at least two hydrogen service ports responsive to the temperature control command. Alternatively, the valve array or multi-way valve may be used for selectively blending hydrogen from the first conduit and hydrogen from the second conduit responsive to the temperature control command. The second temperature may be at least 30 Celsius degrees less than the first temperature.

A method of operating a hydrogen dispensing station is disclosed. The method of operating the hydrogen dispensing station comprises generating a control command in a controller responsive to a fast dispensing rate algorithm; electronically communicating the control command to a means for limiting receiving vessel gas temperature during dispensing; passing a hydrogen-containing feed stream having a first temperature to a means for limiting receiving vessel gas temperature during dispensing to form a regulated stream; simultaneously passing a first portion of the regulated stream to a first hydrogen service port and a second portion of the regulated stream to a second hydrogen service port; and simultaneously dispensing a first dispensing stream from the first hydrogen service port into a first receiving vessel, the first dispensing stream obtained from the first portion of the regulated stream, and dispensing a second dispensing stream from the second hydrogen service port into a second receiving vessel, the second dispensing stream obtained from the second portion of the regulated stream.

The control command may be a pressure ramp rate control command, the means for limiting receiving vessel gas temperature during dispensing may be a programmable pressure control valve, and the regulated stream may be a pressure ramp rate regulated stream. The method may further comprise operating the programmable pressure control valve responsive to the pressure ramp rate control command thereby forming the pressure ramp rate regulated stream.

The control command may be a temperature control command, the means for limiting receiving vessel gas temperature during dispensing may be a valve array, and the regulated stream may be a temperature regulated stream. The method may further comprise passing a second hydrogen-containing feed stream having a second temperature different from the first temperature to the valve array; and regulating the hydrogen-containing feed stream and the second hydrogen-containing feed stream via the valve array responsive to the temperature control command thereby forming the temperature regulated stream. The second temperature may be at least 30 Celsius degrees less than the first temperature.

The control command may be a temperature control command, the means for limiting receiving vessel gas temperature during dispensing may be a coolant flow regulated heat exchanger, and the regulated stream may be a temperature regulated stream. The method may then further comprise regulating a coolant flow through the coolant flow regulated heat exchanger responsive to the temperature control command thereby forming the temperature regulated stream.

The control command may be a temperature control command, the means for limiting receiving vessel gas temperature during dispensing may be a valve array, and the regulated stream may be a temperature regulated stream. The method may then further comprise selectively passing the hydrogen-containing feed stream to a heat exchanger via the valve array responsive to the temperature control command thereby forming the temperature regulated stream.

The control command may be a temperature control command, the means for limiting receiving vessel gas temperature during dispensing may be a multi-way valve, and the regulated stream may be a temperature regulated stream The method may then further comprise passing a second hydrogen-containing feed stream having a second temperature different from the first temperature to the multi-way valve; and regulating the hydrogen-containing feed stream and the second hydrogen-containing feed stream via the multi-way valve responsive to the temperature control command thereby forming the temperature regulated stream. The second temperature may be at least 30 Celsius degrees less than the first temperature.

DETAILED DESCRIPTION

Figure 1:
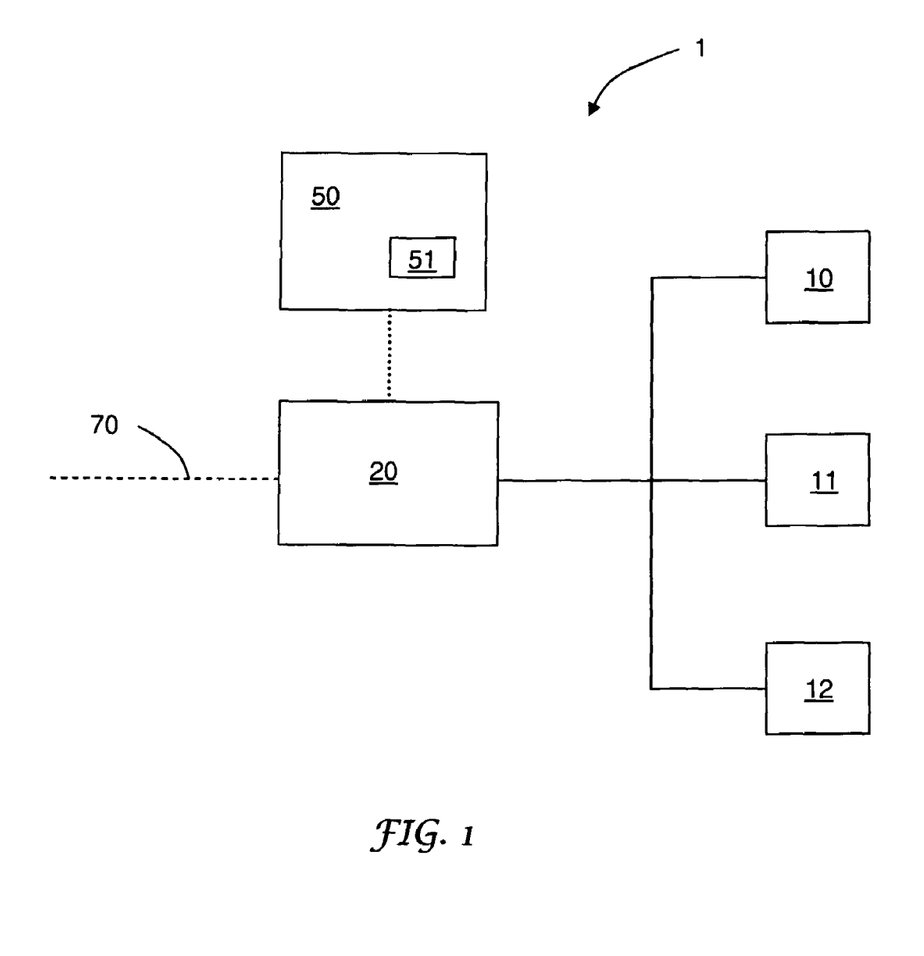
FIG. 1 is a generalized block diagram illustrating components of a hydrogen dispensing station.

Referring to the drawings, wherein like reference numbers refer to like elements throughout the several views, there is shown in FIG. 1 a hydrogen dispensing station 1 comprising at least two hydrogen service ports 10, 11, 12, a means for limiting receiving vessel gas temperature during dispensing 20, and a controller 50 with at least one fast dispensing rate algorithm 51.

The hydrogen dispensing station may also comprise at least one user interface (not shown) as customary.

A conduit 70 containing hydrogen may be in upstream fluid communication with the means for limiting receiving vessel gas temperature during dispensing 20. The conduit 70 may convey hydrogen from at least one hydrogen source (not shown). The at least one hydrogen source may be liquid hydrogen stored in one or more suitable insulated containers known in the art, compressed hydrogen gas stored in compressed gas tubes known in the art, pipeline hydrogen, or other suitable hydrogen source known in the art.

Since the hydrogen dispensing station is for dispensing hydrogen gas into at least two receiving vessels, the hydrogen dispensing station comprises at least two hydrogen service ports 10, 11, 12. The hydrogen service ports 10, 11, 12, are generally the same construction, but they may be different from each other. FIG. 1 illustrates 3 hydrogen service ports, but may easily be adapted to include 2 or more as desired. A service port is configured to connect to a receiving vessel, for example a receiving vessel of a hydrogen powered vehicle. A hydrogen powered vehicle may be an automobile, bus, forklift, truck, go-cart, golf cart, or any other hydrogen powered vehicle known in the art. Receiving vessels may be constructed of various metals or composite materials known in the art. Receiving vessels may have different volumes.

The hydrogen dispensing station may be used to simultaneously dispense to multiple receiving vessels having the same or different volumes from each other. The hydrogen dispensing station may be used to simultaneously dispense to multiple receiving vessels having the same or different materials of construction.

As shown in FIG. 1, the means for limiting receiving vessel gas temperature during dispensing 20 is in upstream fluid communication with the at least two hydrogen service ports 10, 11, 12. Hydrogen passes through the means for limiting receiving vessel gas temperature during dispensing 20 before passing to the at least two service ports 10, 11, 12. The means for limiting receiving vessel gas temperature during dispensing 20 is a component that is capable of limiting the gas temperature rise in a receiving vessel during dispensing. The means for limiting receiving vessel gas temperature during dispensing 20 is shared by the at least two service ports 10, 11, 12.

As shown by the dotted line in FIG. 1, the controller 50 with at least one fast dispensing rate algorithm 51 is in electronic communication with the means for limiting receiving vessel gas temperature during dispensing 20. The controller may be a computer, programmable logic controller (PLC) or the like. The electronic communication may be hardwired or wireless.

The controller 50 generates a control command. The control command may be at least one of a pressure ramp rate control command and a temperature control command responsive to the at least one fast dispensing rate algorithm 51. Programs for controllers are well-known in the art. One skilled in the art may readily create and/or modify programs incorporating fast dispensing rate algorithms.

A fast dispensing rate is defined herein as rate of dispensing to a target pressure having a time-averaged rate greater than 25 bar/minute. A fast dispensing rate algorithm is a procedure used by the controller 50 to control dispensing at a time-averaged rate greater than 25 bar/minute. A dispensing rate algorithm may cause the dispensing rate to be constant during dispensing or to vary as a function of time, receiving vessel pressure, line pressure, or other suitable parameter. U.S. patent application Ser. No. 11/352,041 discloses hydrogen dispensing where the pressure ramp rate during dispensing is varied.

For example, if a receiving vessel has an initial pressure of 50 bar and the target pressure is 700 bar, a dispensing rate algorithm that provides a dispensing time less than 26 minutes $$\left( \frac{(750-50) \text{ bar}}{25 \text{ bar/min}} = 26 \min \right)$$

constitutes a fast dispensing rate algorithm. For a receiving vessel having an initial pressure of 50 bar and a target pressure of 350 bar, a dispensing rate algorithm that provides a dispensing time less than 12 minutes constitutes a fast dispensing rate algorithm.

"Pressure ramp rate" is defined as pressure increase per unit time. The pressure ramp rate may be controlled by controlling the flow rate and/or varying the flow resistance by a valve, for example.

Pressure ramp rate control is regulation of the pressure ramp rate. The pressure ramp rate may be controlled based on pressure measurement in a conduit or the receiving vessel(s). The pressure ramp rate that is used may vary depending on the time of day, the number of receiving vessels connected to the hydrogen dispensing station, the number of receiving vessels waiting to be filled, the status of the compression system if present, and/or the status of the cooling system if present.

A pressure ramp rate control command is a command or signal from a controller to a device that affects the pressure ramp rate in a conduit or vessel.

Temperature control is regulation of the temperature of the hydrogen. The temperature may be regulated by passing a portion or all of the hydrogen through one or more heat exchangers, and/or blending hydrogen streams having different temperatures.

A temperature control command is a command or signal from a controller to a device that affects the temperature in a conduit or vessel.

Referring to FIG. 1, a hydrogen dispensing station 1 may be operated by generating a control command in a controller 50 responsive to a fast dispensing rate algorithm 51; electronically communicating the control command to a means for limiting receiving vessel gas temperature during dispensing 20; passing a hydrogen-containing feed stream having a first temperature to the means for limiting receiving vessel gas temperature during dispensing 20 to form a regulated stream; simultaneously passing a first portion of the regulated stream to a first hydrogen service port 10 and a second portion of the regulated stream to a second hydrogen service port 11; and simultaneously dispensing a first dispensing stream from the first hydrogen service port 10 into a first receiving vessel, the first dispensing stream obtained from the first portion of the regulated stream, and dispensing a second dispensing stream from the second hydrogen service port 11 into a second receiving vessel, the second dispensing steam obtained from the second portion of the regulated stream.

Figure 2:
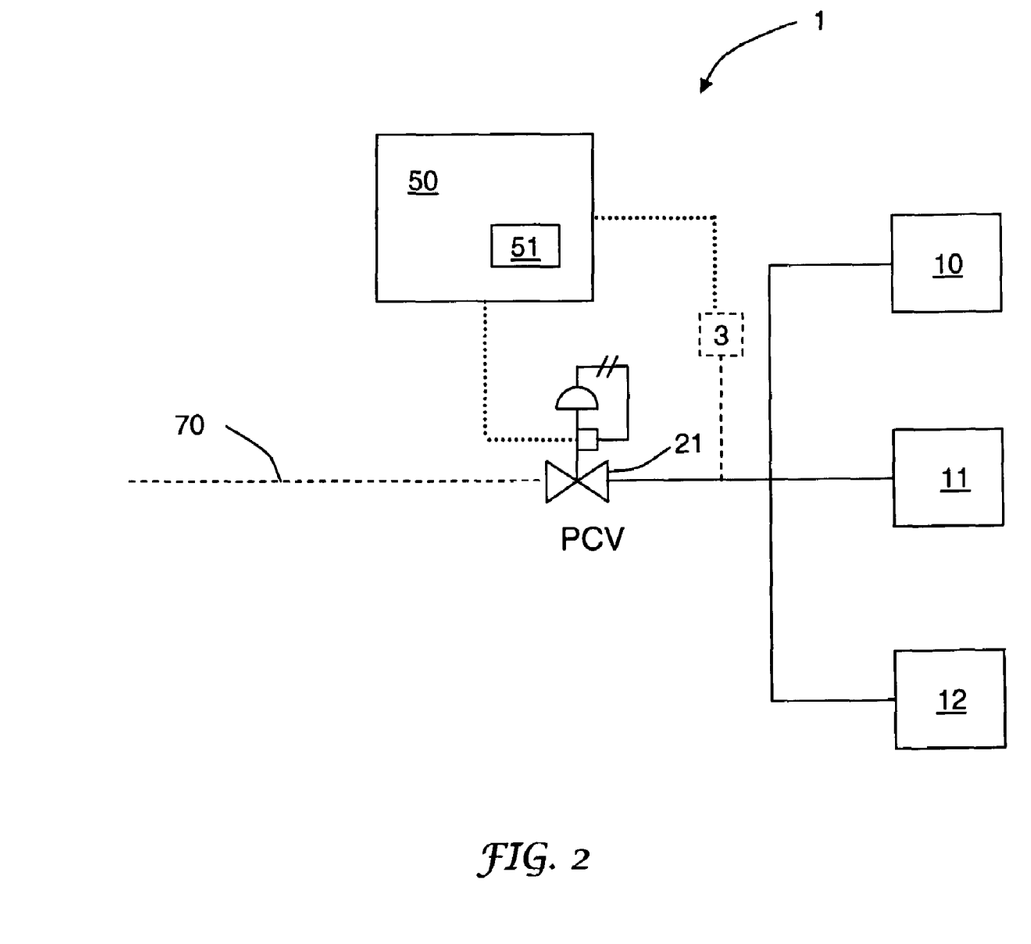
FIG. 2 is a block diagram illustrating components of a hydrogen dispensing station.

In FIG. 2, the means for limiting receiving vessel gas temperature during dispensing is shown as a programmable pressure control valve 21. A conduit 70 containing hydrogen may be in upstream fluid communication with the programmable pressure control valve 21. The controller 50, processing the procedure of the at least one fast dispensing rate algorithm 51, sends a pressure ramp rate control command to the programmable pressure control valve 21 by way of wired or wireless electronic communication. The programmable pressure control valve 21, receives the pressure ramp rate control command and responsive to the pressure ramp rate control command, modifies the pressure ramp rate of the gas passing through the programmable pressure control valve 21.

A programmable pressure control valve is a valve that translates a signal from a computer or PLC into a desired pressure exiting the valve. For example, a programmable pressure control valve may comprise a Ronan X55-600-EX-SM-HG I/P that translates the PLC signal to a pressure signal that communicates with a Tescom 26-2061U66A47AR dome loaded pressure regulator. The dome loaded pressure regulator ultimately controls the pressure to the receiving vessel. Configuring the programmable pressure control valve may be readily accomplished by one skilled in the art.

As shown in FIG. 2, the hydrogen dispensing station 1 may optionally comprise a pressure sensor 3, such as a pressure transducer, between the programmable pressure control valve 21 and the at least two hydrogen service ports 10, 11, 12. The pressure sensor 3 may provide a pressure signal back to the controller 50 and the at least one fast dispensing rate algorithm 51 may be responsive to the pressure signal. Electronic communication between the pressure sensor 3 and the controller 50 may be hardwired or wireless.

Alternatively, signals from pressure sensors (not shown) in pressure sensing communication with one or more receiving vessels may be relayed to the controller 50 and the at least one fast dispensing rate algorithm 51 may be responsive to these receiving vessel pressure sensor signals.

Referring to FIG. 2, a hydrogen dispensing station 1 may be operated by generating a pressure ramp rate control command in a controller 50 responsive to a fast dispensing rate algorithm 51; electronically communicating the pressure ramp rate control command to a programmable pressure control valve 21; passing a hydrogen-containing feed stream having a first temperature to the programmable pressure control valve 21 to form a pressure ramp rate regulated stream; operating the programmable pressure control valve 21 responsive to the pressure ramp rate control command thereby forming the pressure ramp rate regulated stream; simultaneously passing a first portion of the pressure ramp rate regulated stream to a first hydrogen service port 10 and a second portion of the pressure ramp rate regulated stream to a second hydrogen service port 11; and simultaneously dispensing a first dispensing stream from the first hydrogen service port 10 into a first receiving vessel, the first dispensing stream obtained from the first portion of the pressure ramp rate regulated stream, and dispensing a second dispensing stream from the second hydrogen service port 11 into a second receiving vessel, the second dispensing steam obtained from the second portion of the pressure ramp rate regulated stream.

Figure 3:
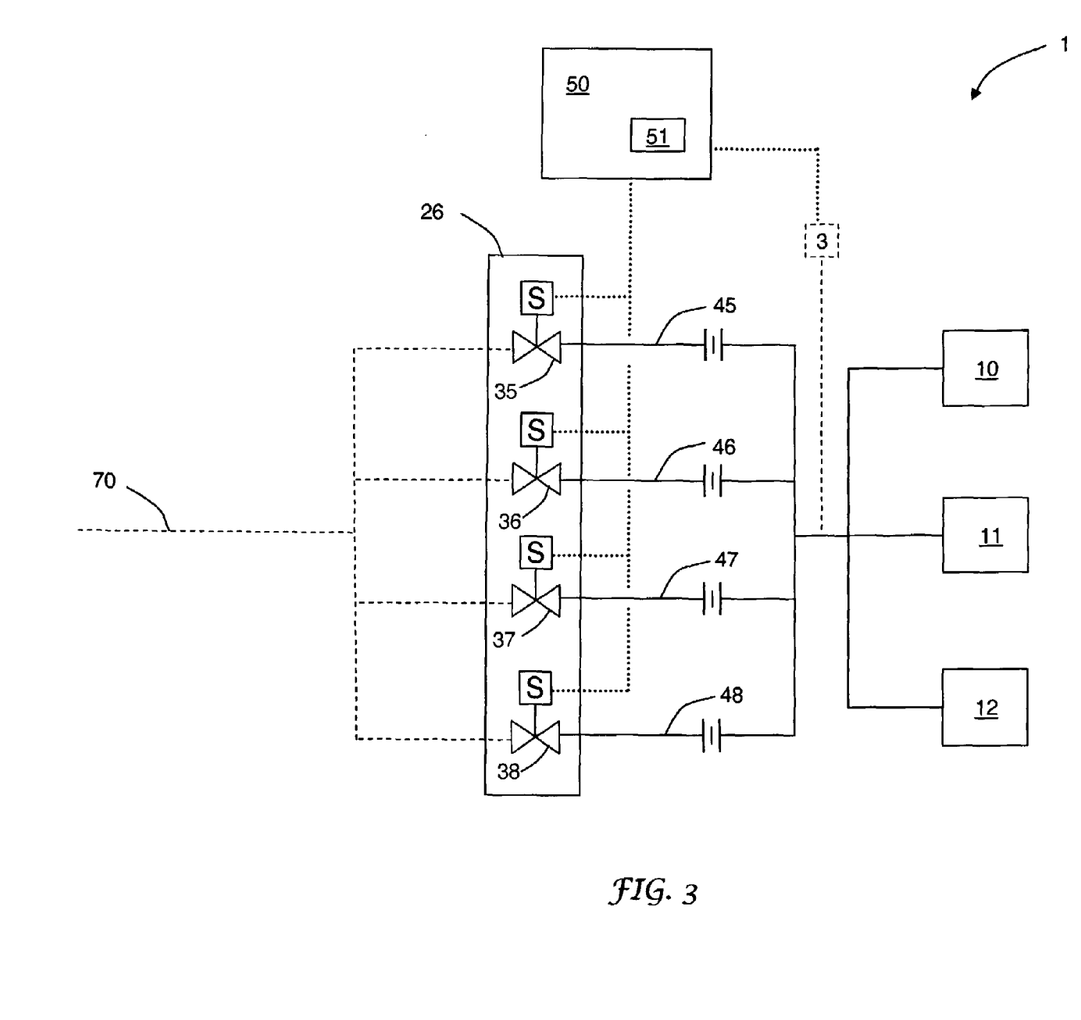
FIG. 3 is a block diagram illustrating components of a hydrogen dispensing station.

In FIG. 3, the hydrogen dispensing station 1 comprises a plurality of gas transmission lines (45-48) each having differing orifice coefficients for transmitting hydrogen gas at different flow rates therethrough. As used herein, plurality means at least three. The means for limiting receiving vessel gas temperature during dispensing is a valve array 26 for selectively passing all or a portion of the hydrogen gas through the plurality of gas transmission lines (45-48) responsive to a pressure control command. The valve array may comprise two or more valves to selectively pass hydrogen gas through the plurality of gas transmission lines to affect the pressure ramp rate. The valves in the valve array may be multi-way valves (not shown) to reduce the total number of valves.

Pressure ramp rate control via a plurality of gas transmission lines having differing orifice coefficients for transmitting gas at different flow rates is described in co-pending U.S. patent application Ser. No. 11/247,561, and is incorporated herein by reference.

As shown in FIG. 3, valve array 26 comprises valves 35-38. A conduit 70 containing hydrogen is in fluid communication with the valve array 26. Hydrogen is passed to the valve array 26. Controller 50 is in electronic communication with the valve array 26. Controller 50 sends a pressure control command, responsive to at least one fast dispensing rate algorithm 51, to valve array 26 by way of wired or wireless electronic communication. Valves 35-38 open and close in response to the pressure control command to regulate pressure ramp rate through the plurality of gas transmission lines (45-48) thereby regulating the pressure ramp rate of the hydrogen passed to the at least two hydrogen service ports 10, 11, 12. Valve 35, when open, directs hydrogen through gas transmission line 45. Valve 36, when open, directs hydrogen through gas transmission line 46. Valve 37, when open, directs hydrogen through gas transmission line 47. Valve 38, when open, directs hydrogen through gas transmission line 48. Valve array 26 may be operated so that hydrogen is passed through one or more gas transmission lines at any given time.

The plurality of gas transmission lines (45-48) may be downstream of the valve array 26 as shown in FIG. 3 or upstream of the valve array 26.

As shown in FIG. 3, the hydrogen dispensing station 1 may optionally comprise a pressure sensor 3, such as a pressure transducer, upstream of the at least two hydrogen service ports 10, 11, 12. The pressure sensor 3 may provide a pressure signal back to the controller 50 and the at least one fast dispensing rate algorithm 51 may be responsive to the pressure signal. Electronic communication between the pressure sensor 3 and the controller 50 may be hardwired or wireless.

Alternatively, signals from pressure sensors (not shown) in pressure sensing communication with one or more receiving vessels may be relayed to the controller 50 and the at least one fast dispensing rate algorithm 51 may be responsive to these receiving vessel pressure sensor signals.

Referring to FIG. 3, a hydrogen dispensing station 1 may be operated by generating a pressure ramp rate control command in a controller 50 responsive to a fast dispensing rate algorithm 51; electronically communicating the pressure ramp rate control command to a valve array 26; passing a hydrogen-containing feed stream having a first temperature to the valve array 26 to form a pressure ramp rate regulated stream; selectively passing the hydrogen-containing feed stream to at least three gas transmission lines (45-48) via the valve array 26 responsive to the pressure ramp rate control command thereby forming the pressure ramp rate regulated stream; simultaneously passing a first portion of the pressure ramp rate regulated stream to a first hydrogen service port 10 and a second portion of the pressure ramp rate regulated stream to a second hydrogen service port 11; and simultaneously dispensing a first dispensing stream from the first hydrogen service port 10 into a first receiving vessel, the first dispensing stream obtained from the first portion of the pressure ramp rate regulated stream, and dispensing a second dispensing stream from the second hydrogen service port 11 into a second receiving vessel, the second dispensing steam obtained from the second portion of the pressure ramp rate regulated stream.

Figure 4:
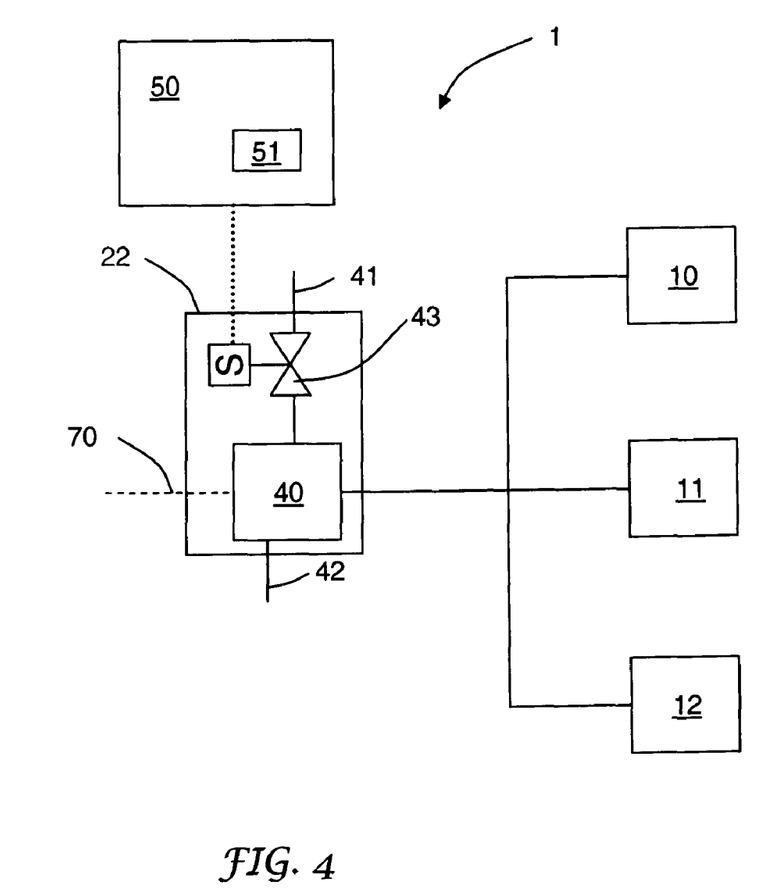
FIG. 4 is a block diagram illustrating components of a hydrogen dispensing station.

A hydrogen dispensing station 1 is shown in FIG. 4, where the means for limiting receiving vessel gas temperature during dispensing is a coolant flow regulated heat exchanger 22 for providing regulated indirect heat exchange responsive to a temperature control command. A conduit 70 containing hydrogen is shown in fluid communication with a heat exchanger 40. A hydrogen-containing feed stream is passed to heat exchanger 40 where it is cooled by a coolant. A coolant feed stream 41 is passed to regulating valve 43 and to heat exchanger 40 where it cools the hydrogen-containing feed stream. A coolant effluent stream 42 leaves the heat exchanger 40. Regulating valve 43 is responsive to the temperature control command generated from the controller 50 which is responsive to the at least one fast dispensing rate algorithm 51. Regulating valve 43 regulates the flow of coolant. After passing through the heat exchanger 40, a cooled hydrogen stream is passed to the at least two hydrogen service ports 10, 11, 12.

The heat exchanger 40 may be shell and tube heat exchanger or other conventional heat exchanger known in the art. A coolant flow regulated heat exchanger is a heat exchanger where the coolant flow is regulated. The coolant may be a refrigerant, for example R12, R22, R134a, etc.

The hydrogen dispensing station 1 may optionally comprise a temperature sensor (not shown), such as a thermocouple, between the coolant flow regulated heat exchanger 22 and the at least two hydrogen service ports 10, 11, 12. The temperature sensor may provide a temperature signal back to the controller 50 and the at least one fast dispensing rate algorithm 51 may be responsive to the temperature signal. Electronic communication between the temperature sensor and the controller 50 may be hardwired or wireless. Temperature sensors (not shown) may additionally or alternatively be located in the receiving vessels and provide a signal to the controller 50 by hardwired or wireless means.

The coolant flow regulated heat exchanger 22 may alternatively comprise a thermal mass (not shown). A coolant may pass to heat exchanger 40 where the thermal mass, for example a large block of aluminum, is cooled. The hydrogen-containing feed stream may then be cooled by the block of aluminum.

Referring to FIG. 4, a hydrogen dispensing station 1 may be operated by generating a temperature control command in a controller 50 responsive to a fast dispensing rate algorithm 51; electronically communicating the temperature control command to a coolant flow regulated heat exchanger 22; passing a hydrogen-containing feed stream having a first temperature to the coolant flow regulated heat exchanger 22 to form a temperature regulated stream; regulating a coolant flow through the coolant flow regulated heat exchanger 22 responsive to the temperature control command thereby forming the temperature regulated stream; simultaneously passing a first portion of the temperature regulated stream to a first hydrogen service port 10 and a second portion of the temperature regulated stream to a second hydrogen service port 11; and simultaneously dispensing a first dispensing stream from the first hydrogen service port 10 into a first receiving vessel, the first dispensing stream obtained from the first portion of the temperature regulated stream, and dispensing a second dispensing stream from the second hydrogen service port 11 into a second receiving vessel, the second dispensing steam obtained from the second portion of the temperature regulated stream.

Regulating coolant flow may be by stopping coolant flow, allowing coolant flow and/or varying coolant flow rate.

Figure 5:
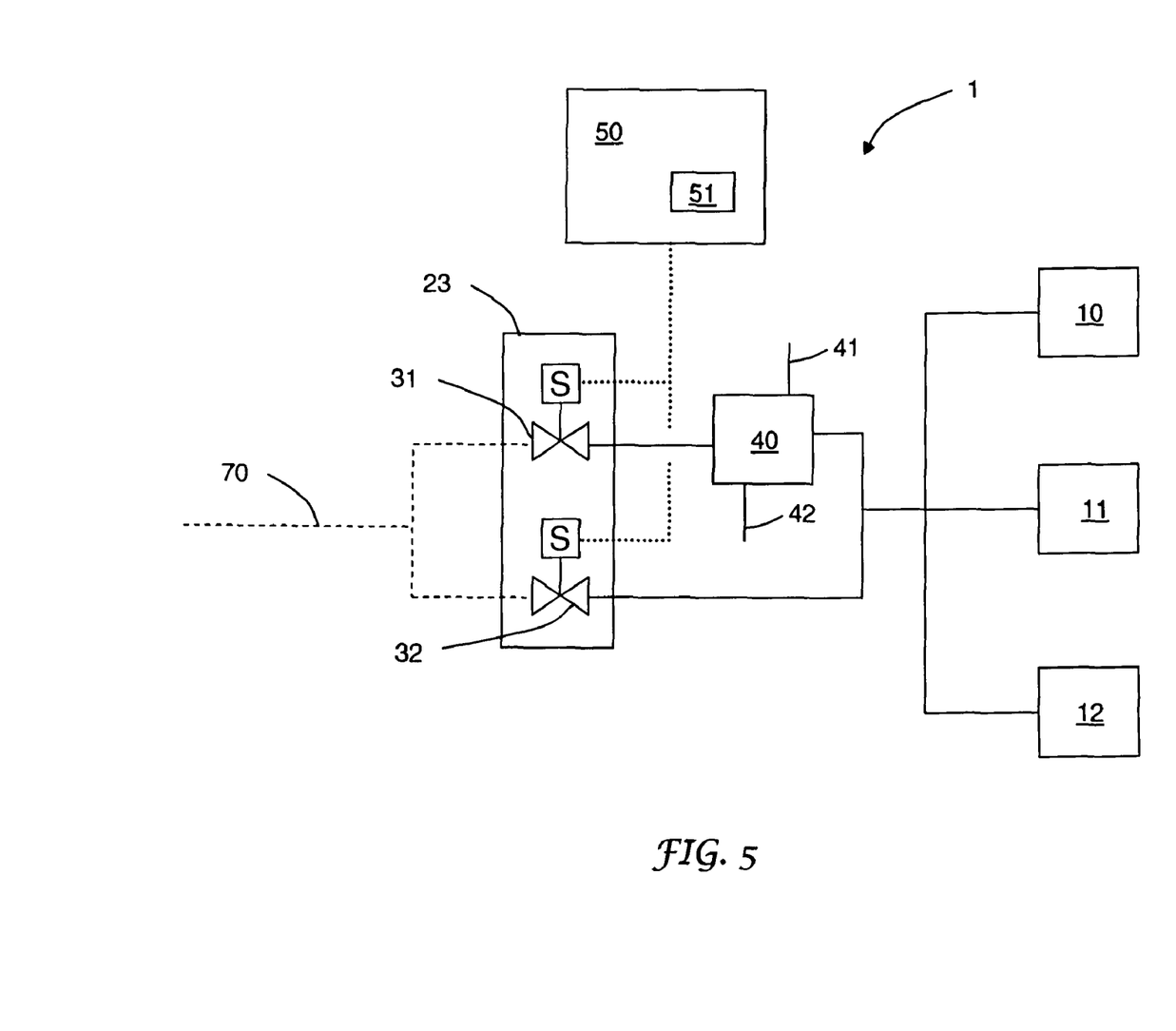
FIG. 5 is a block diagram illustrating components of a hydrogen dispensing station.

In FIG. 5, the hydrogen dispensing station 1 comprises a heat exchanger 40. The means for limiting receiving vessel gas temperature during dispensing is a valve array 23 for selectively passing all or a portion of the hydrogen gas through the heat exchanger 40 responsive to a temperature control command. The valve array may comprise two or more valves to selectively pass hydrogen gas through the heat exchanger for cooling or bypass the heat exchanger to avoid cooling. The valves in the valve array may be multi-way valves (not shown) to reduce the total number of valves.

As shown in FIG. 5, valve array 23 comprises valve 31 and valve 32. A conduit 70 containing hydrogen is in fluid communication with the valve array 23. Hydrogen is passed to the valve array 23. Controller 50, which is in electronic communication with the valve array, sends a temperature control command, responsive to at least one fast dispensing rate algorithm 51, to valve array 23. Valves 31 and 32 open and close in response to the temperature control command to regulate the flow of hydrogen through the heat exchanger 40 thereby regulating the temperature of the hydrogen passed to the at least two hydrogen service ports 10, 11, 12. Valve 31, when open, directs hydrogen through heat exchanger 40 for cooling. Hydrogen gas passed through valve 32 bypasses heat exchanger 40. Valve array 23 may be operated so that all or part of the hydrogen is passed through the heat exchanger at any given time.

The hydrogen dispensing station 1 of FIG. 5 may optionally comprise a temperature sensor (not shown), such as a thermocouple, between the heat exchanger 40 and the at least two hydrogen service ports 10, 11, 12. The temperature sensor may provide a temperature signal back to the controller 50 and the fast dispensing rate algorithm 51 may be responsive to the temperature signal. Electronic communication between the temperature sensor and the controller 50 may be hardwired or wireless. Temperature sensors (not shown) may additionally or alternatively be located in the receiving vessels and provide a signal to the controller 50 by hardwired or wireless means.

As shown in FIG. 5, a coolant stream 41 may be introduced into heat exchanger 40 and withdrawn as effluent stream 42. Heat exchanger 40 may comprise a thermal mass as described above.

Referring to FIG. 5, a hydrogen dispensing station 1 may be operated by generating a temperature control command in a controller 50 responsive to a fast dispensing rate algorithm 51; electronically communicating the temperature control command to a valve array 23; passing a hydrogen-containing feed stream having a first temperature to the valve array 23 to form a temperature regulated stream; selectively passing the hydrogen-containing feed stream to a heat exchanger 40 via the valve array 23 responsive to the temperature control command thereby forming the temperature regulated stream; simultaneously passing a first portion of the temperature regulated stream to a first hydrogen service port 10 and a second portion of the temperature regulated stream to a second hydrogen service port 11; and simultaneously dispensing a first dispensing stream from the first hydrogen service port 10 into a first receiving vessel, the first dispensing stream obtained from the first portion of the temperature regulated stream, and dispensing a second dispensing stream from the second hydrogen service port 11 into a second receiving vessel, the second dispensing steam obtained from the second portion of the temperature regulated stream.

Figure 6:
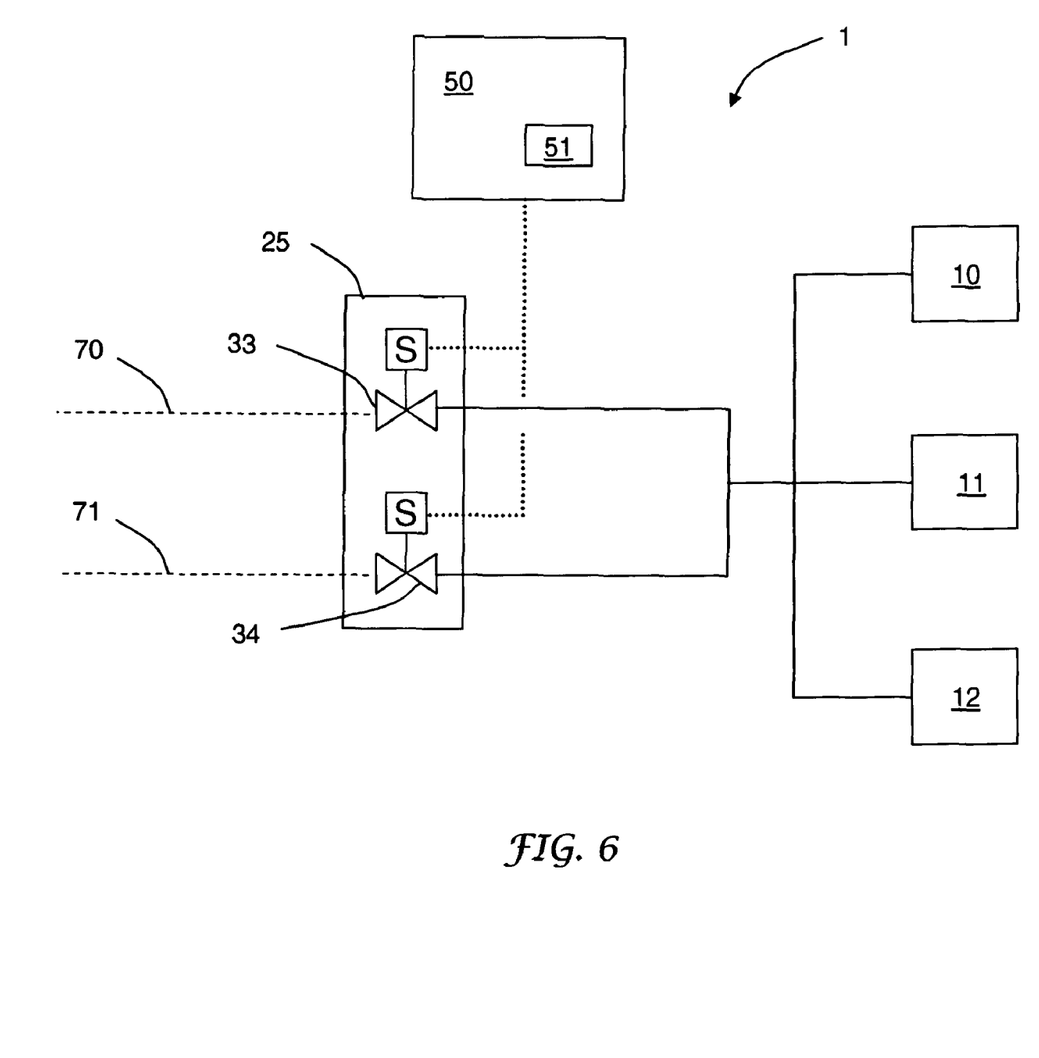
FIG. 6 is a block diagram illustrating components of a hydrogen dispensing station.

In FIG. 6, the hydrogen dispensing station 1 comprises a conduit 70 containing hydrogen having a first temperature and a conduit 71 containing hydrogen having a second temperature different from the first temperature. The hydrogen in the first conduit is at the first temperature and the hydrogen in the second conduit is at the second temperature. The first temperature refers to the temperature of the hydrogen in the first conduit. The second temperature refers to the temperature of the hydrogen in the second conduit. The first temperature may be, for example, ambient temperature, or in the range of 0 degrees Celsius to 40 degrees Celsius. The second temperature may be at least 30 Celsius degrees less than the first temperature. Some hydrogen for the hydrogen dispensing station 1 may be stored as liquid hydrogen. The boiling point temperature of hydrogen at 1 atmosphere pressure is about $-253°$ C., so the second temperature may be as low as $-253°$ C.

In FIG. 6, the means for limiting receiving vessel gas temperature during dispensing is a valve array 25 for selectively passing and/or blending hydrogen from conduit 70 and hydrogen from conduit 71 simultaneously to the at least two hydrogen service ports 10, 11, 12, responsive to a temperature control command. The valve array may comprise two or more valves to selectively pass hydrogen from conduit 70 or conduit 71, or to blend hydrogen from conduit 70 and conduit 71.

As shown in FIG. 6, valve array 25 comprises valve 33 and valve 34. Conduit 70 and conduit 71 are in fluid communication with the valve array 25. Hydrogen from conduit 70 and conduit 71 is passed to valve array 25. Controller 50, which is in electronic communication with the valve array, sends a temperature control command to valve array 25 responsive to the at least one fast dispensing rate algorithm 51. Valves 33 and 34 open and close in response to the temperature control command and regulate the flow of hydrogen from conduit 70 and conduit 71 thereby regulating the temperature of the hydrogen passed to the at least two hydrogen service ports 10, 11, 12. Valve 33, when open, directs hydrogen from conduit 70 to the at least two hydrogen service ports 10, 11, 12. Valve 34, when open, directs hydrogen from conduit 71 to the at least two hydrogen service ports 10, 11, 12.

The hydrogen dispensing station 1 of FIG. 6 may optionally comprise a temperature sensor (not shown), such as a thermocouple, between the valve array 25 and the at least two hydrogen service ports 10. The temperature sensor may provide a temperature signal back to the controller 50 and the fast dispensing rate algorithm 51 may be responsive to the temperature signal. Electronic communication between the temperature sensor and the controller 50 may be hardwired or wireless. Temperature sensors (not shown) may additionally or alternatively be located in the receiving vessels and provide a signal to the controller 50 by hardwired or wireless means.

Referring to FIG. 6, a hydrogen dispensing station 1 may be operated by generating a temperature control command in a controller 50 responsive to a fast dispensing rate algorithm 51; electronically communicating the temperature control command to a valve array 25; passing a hydrogen-containing feed stream having a first temperature to the valve array 25 to form a temperature regulated stream; passing a second hydrogen-containing feed stream having a second temperature different from the first temperature to the valve array 25; regulating the hydrogen-containing feed stream and the second hydrogen-containing feed stream via the valve array 25 responsive to the temperature control command thereby forming the temperature regulated stream; simultaneously passing a first portion of the temperature regulated stream to a first hydrogen service port 10 and a second portion of the temperature regulated stream to a second hydrogen service port 11; and simultaneously dispensing a first dispensing stream from the first hydrogen service port 10 into a first receiving vessel, the first dispensing stream obtained from the first portion of the temperature regulated stream, and dispensing a second dispensing stream from the second hydrogen service port 11 into a second receiving vessel, the second dispensing steam obtained from the second portion of the temperature regulated stream.

Regulating the hydrogen-containing feed stream and the second hydrogen-containing feed stream via the valve array may be by stopping flow, allowing flow, and/or blending flow in various proportions.

The second temperature may be at least 30 Celsius degrees less than the first temperature.

Figure 7:
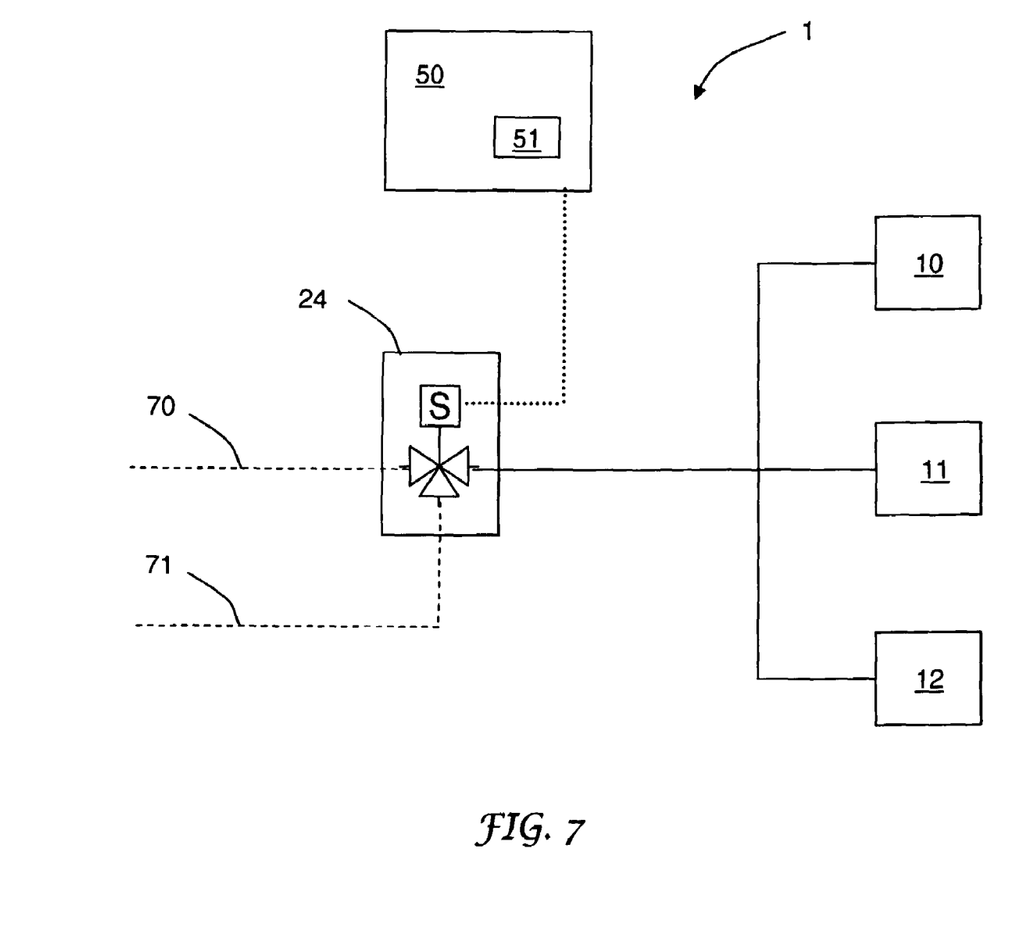
FIG. 7 is a block diagram illustrating components of a hydrogen dispensing station.

In FIG. 7, the hydrogen dispensing station 1 comprises a conduit 70 containing hydrogen having a first temperature and a conduit 71 containing hydrogen having a second temperature different from the first temperature. The relationship between the first temperature and the second temperature may be the same as described above.

In FIG. 7, the means for limiting receiving vessel gas temperature during dispensing is a multi-way valve 24 for selectively passing and/or blending hydrogen from conduit 70 and hydrogen from conduit 71 simultaneously to the at least two hydrogen service ports 10 responsive to a temperature control command. The multi-way valve 24 is shown as a three-way valve but may be easily adapted to use four-way or greater multi-way valves. The multi-way valve may be used to selectively pass hydrogen from conduit 70 or conduit 71, or to blend hydrogen from conduit 70 and conduit 71.

As shown in FIG. 7, conduit 70 and conduit 71 are in fluid communication with the multi-way valve 24. Hydrogen from conduit 70 and conduit 71 is passed to multi-way valve 24. Controller 50, which is in electronic communication with the valve array, sends a temperature control command to multi-way valve 24 responsive to the at least one fast dispensing rate algorithm 51. Multi-way valve 24 opens and closes in response to the temperature control command and regulate the flow of hydrogen from conduit 70 and conduit 71 thereby regulating the temperature of the hydrogen passed to the at least two hydrogen service ports 10, 11, 12.

The hydrogen dispensing station 1 of FIG. 7 may optionally comprise a temperature sensor (not shown), such as a thermocouple, between the multi-way valve 24 and the at least two hydrogen service ports 10, 11, 12. The temperature sensor may provide a temperature signal back to the controller 50 and the fast dispensing rate algorithm 51 may be responsive to the temperature signal. Electronic communication between the temperature sensor and the controller 50 may be hardwired or wireless. Temperature sensors (not shown) may additionally or alternatively be located in the receiving vessels and provide a signal to the controller 50 by hardwired or wireless means.

Referring to FIG. 7, a hydrogen dispensing station 1 may be operated by generating a temperature control command in a controller 50 responsive to a fast dispensing rate algorithm 51; electronically communicating the temperature control command to a multi-way valve 24; passing a hydrogen-containing feed stream having a first temperature to the multi-way valve 24 to form a temperature regulated stream; passing a second hydrogen-containing feed stream having a second temperature different from the first temperature to the multi-way valve 24; regulating the hydrogen-containing feed stream and the second hydrogen-containing feed stream via the multi-way valve 24 responsive to the temperature control command thereby forming the temperature regulated stream; simultaneously passing a first portion of the temperature regulated stream to a first hydrogen service port 10 and a second portion of the temperature regulated stream to a second hydrogen service port 11; and simultaneously dispensing a first dispensing stream from the first hydrogen service port 10 into a first receiving vessel, the first dispensing stream obtained from the first portion of the temperature regulated stream, and dispensing a second dispensing stream from the second hydrogen service port 11 into a second receiving vessel, the second dispensing steam obtained from the second portion of the temperature regulated stream.

Regulating the hydrogen-containing feed stream and the second hydrogen-containing feed stream via the multi-way valve may be by stopping flow, allowing flow, and/or blending flow in various proportions.

Figure 8:
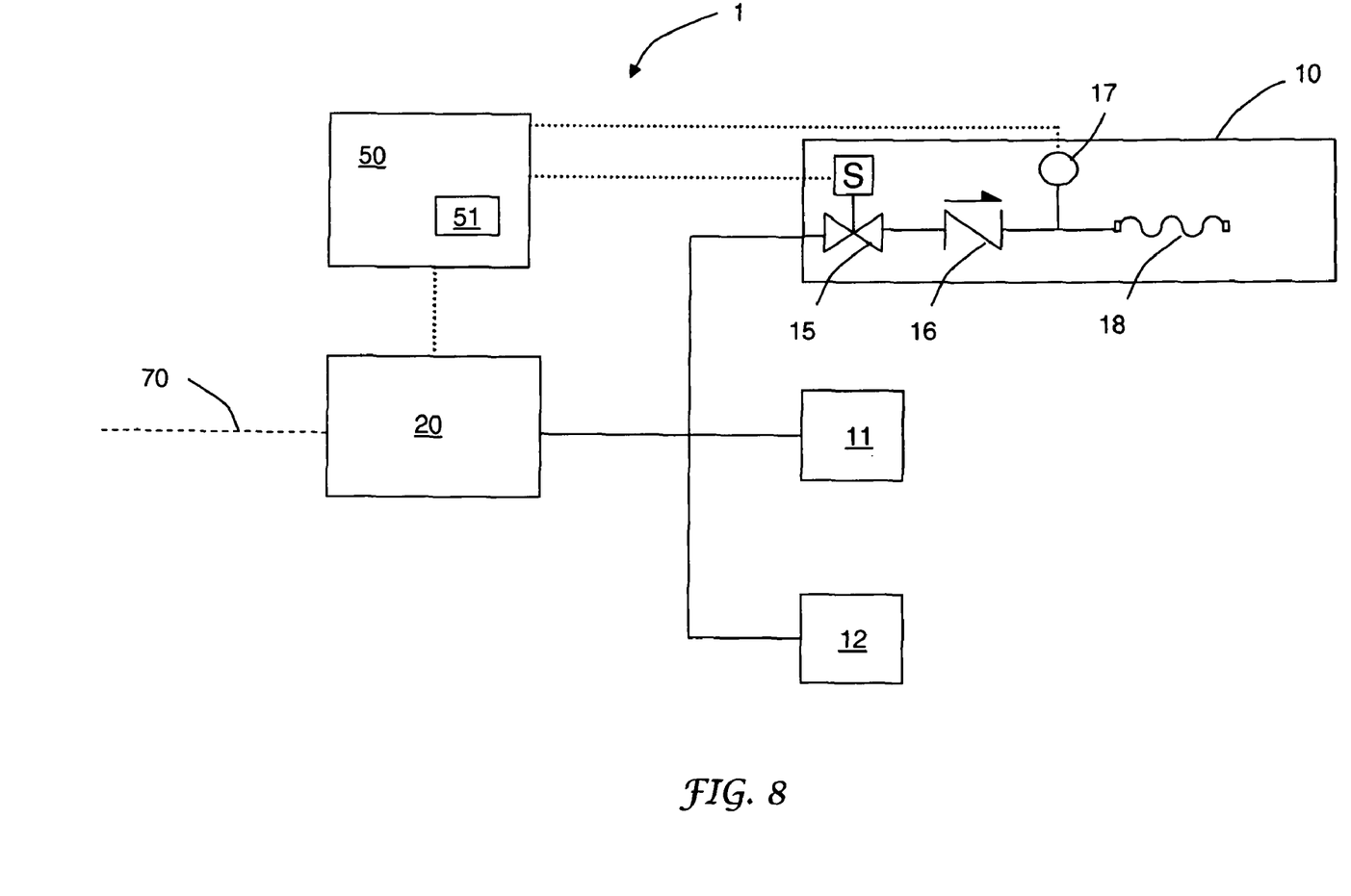
FIG. 8 is a block diagram of a hydrogen dispensing station showing details of a hydrogen service port.

Details of a representative service port 10 are shown in FIG. 8. Service ports are well-known in the art. The service port 10 showing details in FIG. 8 comprises an actuated valve 15, a check valve 16, a pressure sensor 17, and flexible hose with connection 18. The actuated valve 11 may be in hardwired or wireless electronic communication with the controller 50 with at least one fast dispensing rate algorithm 51. Pressure sensor 17 may also be in electronic communication with the controller 50.

Hydrogen is passed from the means for limiting receiving vessel gas temperature during dispensing 20 to each of the hydrogen service ports. Actuated valves such as actuated valve 15, in each of the hydrogen service ports may be opened when a receiving vessel is connected to their respective flexible hoses, thereby allowing dispensing to connected receiving vessels.

Figure 9:
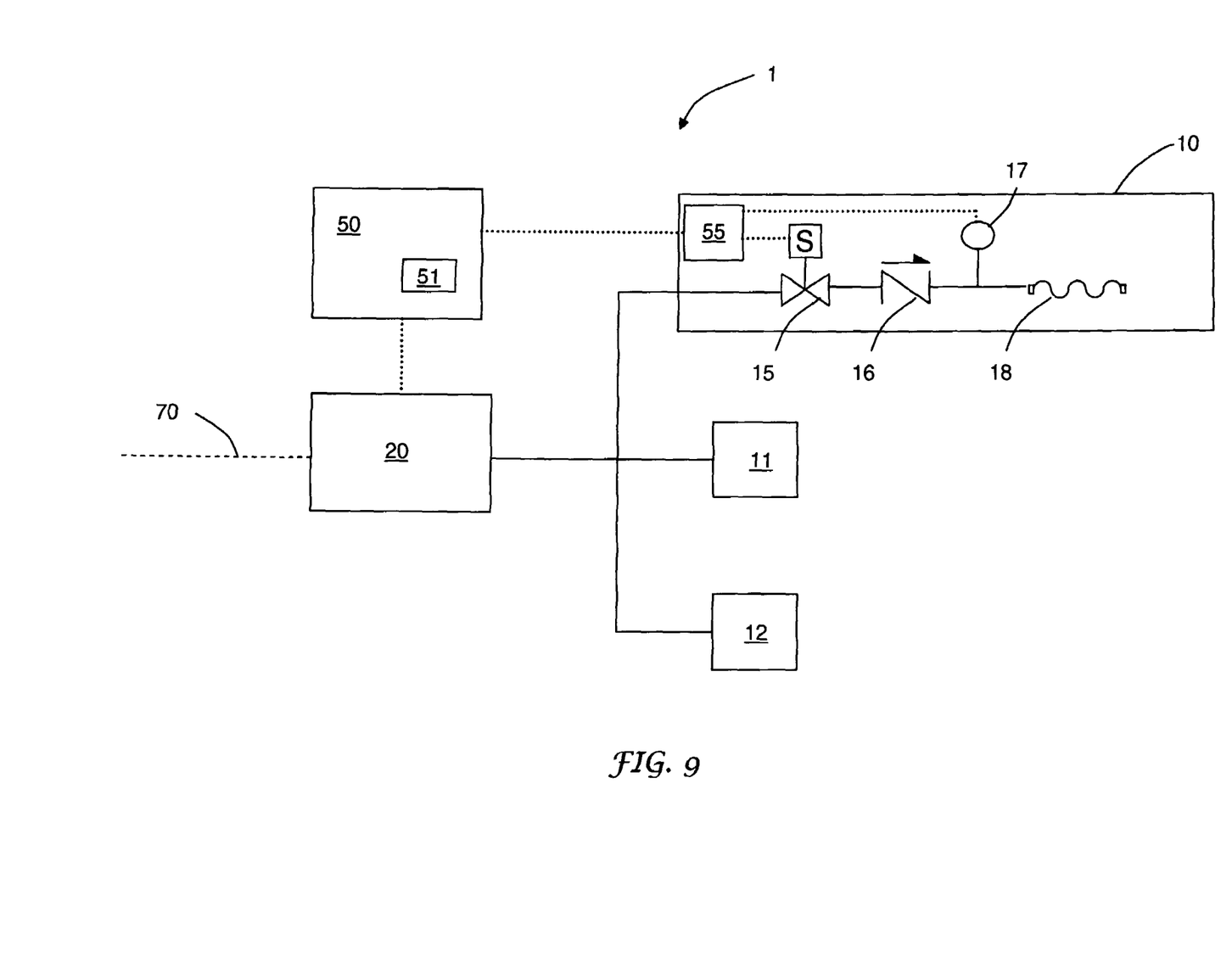
FIG. 9 is a block diagram of a hydrogen dispensing station showing details of a hydrogen service port.

Details of another representative service port 10 are shown in FIG. 9. The service port 10 showing details in FIG. 9 comprises an actuated valve 15, a check valve 16, a pressure sensor 17, and flexible hose with connection 18 and a controller 55. Controller 55 may be a programmable logic controller (PLC), computer, or the like. Providing a controller with the service port simplifies the addition of more service ports to the hydrogen dispensing station. The actuated valve 15 may be in hardwired or wireless electronic communication with the controller 55. Pressure sensor 17 may also be in electronic communication with the controller 55. Controller 55 may be in hardwired or wireless electronic communication with controller 50 with the at least one fast dispensing rate algorithm 51.

The means for limiting receiving vessel gas temperature during dispensing 20 is in fluid communication with each of the hydrogen service ports. Actuated valves such as actuated valve 15, in each of the hydrogen service ports may be opened when a receiving vessel is connected to their respective flexible hoses to allow dispensing to connected receiving vessels.

The hydrogen dispensing station may comprises more than one means for limiting receiving vessel gas temperature during dispensing. By having more than one means for limiting receiving vessel gas temperature during dispensing, the hydrogen dispensing station may simultaneously dispense to a first set of receiving vessels at a first ramp rate and to a second set of receiving vessels at a second ramp rate. For example, two hydrogen service ports may be dispensing to a first receiving vessel and a second receiving vessel when a third receiving vessel is connected to a third service port. The pressure in the third receiving vessel may be significantly lower than the pressure in the first receiving vessel and the second receiving vessel. A second means for limiting receiving vessel gas temperature during dispensing may be used to dispense to the third receiving vessel independently of the first hydrogen service port and the second hydrogen service port. Without a second means for limiting receiving vessel gas temperature during dispensing, the third receiving vessel would have to wait until completion of dispensing to the first receiving vessel and the second receiving vessel before hydrogen can be dispensed into the third receiving vessel.

Hydrogen dispensing stations as described above can be made by the skilled person without undue experimentation. Pipes may be sized to handle an anticipated maximum capacity.

The hydrogen dispensing station may use cascade control of multiple compressed gas cylinders, a technique known in the art.

The following examples are presented to better illustrate the present invention and are not Example 1

Referring to FIG. 2, a first receiving vessel containing hydrogen having a pressure of about 50 bar and a target pressure of about 750 bar is connected to hydrogen service port 10. Controller 50 sends a signal to programmable pressure control valve 21. Flow is initiated at time zero and the pressure ramp rate, controlled by the programmable pressure control valve 21, is about 25 bar/min according to the signal. A second receiving vessel containing hydrogen having a pressure of about 100 bar and a target pressure of about 750 bar is connected to hydrogen service port 11 within 1 minute of time zero. At time equals two minutes, both receiving vessels will have pressure of about 100 bar. At this time, flow is initiated to the second receiving vessel and flow is continued to the first receiving vessel. Hydrogen is dispensed simultaneously to the first receiving vessel and the second receiving vessel at a pressure ramp rate of 25 bar/min via programmable pressure control valve 21. The pressure ramp rate to each of the receiving vessels is about the same, independent of their respective volumes.

A third receiving vessel containing hydrogen having a pressure of about 50 bar and a target pressure of about 750 bar is connected to hydrogen service port 12 at time equals 3 minutes. The pressure in the first receiving vessel and the second receiving vessel is about 125 bar, which is greater than the pressure in the third receiving vessel. Dispensing to the first receiving vessel and the second receiving vessel continue while the third receiving vessel waits until the next dispensing cycle.

At time equals 26 minutes, the pressure in the first receiving vessel and the pressure in the second receiving vessel reaches about 750 bar and dispensing stops.

By providing pressure ramp rate control to the first receiving vessel and the second receiving vessel, receiving vessel gas temperature during dispensing may be limited to a temperature below the receiving vessel rated temperature and/or a more complete fill may be achieved.

Example 2

Referring to FIG. 5, a first receiving vessel containing hydrogen having a pressure of about 25 bar and a target pressure of about 500 bar is connected to hydrogen service port 10. Flow is initiated by controller 50 at time zero. Flow is passed from conduit 70 to the valve array 23 and through valve 32, thereby bypassing the heat exchanger 40. A second receiving vessel containing hydrogen having a pressure of about 100 bar and a target pressure of about 750 bar is connected to hydrogen service port 11 within 1 minute of time zero. The pressure in the first receiving vessel is less than the pressure in the second receiving vessel. When the pressure in the first receiving vessel and the pressure in the second receiving vessel are the same, flow is initiated to the second receiving vessel and flow is continued to the first receiving vessel.

At time equals 3 minutes, valve 32 closes and valve 31 opens thereby passing hydrogen from conduit 70 through the heat exchanger 40 and cooling the hydrogen prior to dispensing to both the first receiving vessel and the second receiving vessel.

At time equals 5 minutes, valve 31 closes and valve 32 opens thereby bypassing heat exchanger 40. Dispensing to the first receiving vessel continues until the first receiving vessel reaches its target pressure of about 500 bar. Dispensing to the second receiving vessel continues until the second receiving vessel reaches its target pressure of about 750 bar.

By providing cooling to some of the hydrogen gas that is dispensed to the first receiving vessel and to the second receiving vessel, receiving vessel gas temperature during dispensing may be limited to a temperature below the receiving vessel rated temperature and/or a more complete fill may be achieved.

We claim:

1. A hydrogen dispensing station comprising:
   at least two hydrogen service ports;
   a means for limiting receiving vessel gas temperature during dispensing, said means for limiting receiving vessel gas temperature during dispensing in upstream fluid communication with the at least two hydrogen service ports; and
   a controller with at least one fast dispensing rate algorithm in electronic communication with the means for limiting receiving vessel gas temperature during dispensing, wherein the controller is capable of generating at least one of a pressure ramp rate control command and a temperature control command responsive to the at least one fast dispensing rate algorithm and the controller is capable of electronically communicating the at least one of a pressure ramp rate control command and a temperature control command to the means for limiting receiving vessel gas temperature during dispensing.

2. The hydrogen dispensing station of claim 1 wherein the means for limiting receiving vessel gas temperature during dispensing is a programmable pressure control valve for receiving the pressure ramp rate control command.

3. The hydrogen dispensing station of claim 1 further comprising:
   at least three gas transmission lines having differing orifice coefficients for transmitting hydrogen gas at different flow rates therethrough; and
   wherein the means for limiting receiving vessel gas temperature during dispensing is a valve array for selectively passing hydrogen gas through the at least three gas transmission lines responsive to the pressure ramp rate control command.

4. The hydrogen dispensing station of claim 1 wherein the means for limiting receiving vessel gas temperature during dispensing is a coolant flow regulated heat exchanger for providing regulated indirect heat exchange responsive to the temperature control command.

5. The hydrogen dispensing station of claim 1 further comprising:
   a heat exchanger; and
   wherein the means for limiting receiving vessel gas temperature during dispensing is a valve array for selectively passing hydrogen gas through the heat exchanger responsive to the temperature control command.

6. The hydrogen dispensing station of claim 1 further comprising:
   a first conduit containing hydrogen having a first temperature;
   a second conduit containing hydrogen having a second temperature different from the first temperature; and
   wherein the means for limiting receiving vessel gas temperature during dispensing is a valve array in fluid communication with the first conduit and the second conduit, the valve array for selectively passing hydrogen from the first conduit and hydrogen from the second conduit simultaneously to the at least two hydrogen service ports responsive to the temperature control command.

7. The hydrogen dispensing station of claim 6 wherein the second temperature is at least 30 Celsius degrees less than the first temperature.

8. The hydrogen dispensing station of claim 1 further comprising:
   a first conduit containing hydrogen having a first temperature;
   a second conduit containing hydrogen having a second temperature different from the first temperature; and
   wherein the means for limiting receiving vessel gas temperature during dispensing is a valve array in fluid communication with the first conduit and the second conduit, the valve array for selectively blending hydrogen from the first conduit and hydrogen from the second conduit responsive to the temperature control command.

9. The hydrogen dispensing station of claim 8 wherein the second temperature is at least 30 Celsius degrees less than the first temperature.

10. The hydrogen dispensing station of claim 1 further comprising:
    a first conduit containing hydrogen having a first temperature;
    a second conduit containing hydrogen having a second temperature different from the first temperature; and
    wherein the means for limiting receiving vessel gas temperature during dispensing is a multi-way valve in fluid communication with the first conduit and the second conduit, the multi-way valve for selectively passing hydrogen from the first conduit and hydrogen from the second conduit to the at least two hydrogen service ports responsive to the temperature control command.

11. The hydrogen dispensing station of claim 10 wherein the second temperature is at least 30 Celsius degrees less than the first temperature.

12. The hydrogen dispensing station of claim 1 further comprising:
    a first conduit containing hydrogen having a first temperature;
    a second conduit containing hydrogen having a second temperature different from the first temperature; and
    wherein the means for limiting receiving vessel gas temperature during dispensing is a multi-way valve in fluid communication with the first conduit and the second conduit, the multi-way valve for selectively blending hydrogen from the first conduit and hydrogen from the second conduit responsive to the temperature control command.

13. The hydrogen dispensing station of claim 12 wherein the second temperature is at least 30 Celsius degrees less than the first temperature.

14. A method of operating the hydrogen dispensing station of claim 1, the method comprising:

generating a control command in the controller responsive to the fast dispensing rate algorithm, wherein the control command is the pressure ramp rate control command or the temperature control command;
electronically communicating the control command to the means for limiting receiving vessel gas temperature during dispensing;
passing a hydrogen-containing feed stream having a first temperature to the means for limiting receiving vessel gas temperature during dispensing to form a regulated stream;
simultaneously passing a first portion of the regulated stream to a first hydrogen service port of the at least two hydrogen service ports and a second portion of the regulated stream to a second hydrogen service port of the at least two hydrogen service ports; and
simultaneously dispensing a first dispensing stream from the first hydrogen service port into a first receiving vessel, the first dispensing stream obtained from the first portion of the regulated stream, and dispensing a second dispensing stream from the second hydrogen service port into a second receiving vessel, the second dispensing stream obtained from the second portion of the regulated stream.

15. The method of claim 14 wherein the control command is the pressure ramp rate control command, the means for limiting receiving vessel gas temperature during dispensing is a programmable pressure control valve, and the regulated stream is a pressure ramp rate regulated stream, the method further comprising:
    operating the programmable pressure control valve responsive to the pressure ramp rate control command thereby forming the pressure ramp rate regulated stream.

16. The method of claim 14 wherein the control command is the temperature control command, the means for limiting receiving vessel gas temperature during dispensing is a valve array, and the regulated stream is a temperature regulated stream, the method further comprising:
    passing a second hydrogen-containing feed stream having a second temperature different from the first temperature to the valve array; and
    regulating the hydrogen-containing feed stream and the second hydrogen-containing feed stream via the valve array responsive to the temperature control command thereby forming the temperature regulated stream.

17. The method of claim 16 wherein the second temperature is at least 30 Celsius degrees less than the first temperature.

18. The method of claim 14 wherein the control command is the temperature control command, the means for limiting receiving vessel gas temperature during dispensing is a coolant flow regulated heat exchanger, and the regulated stream is a temperature regulated stream, the method further comprising:
    regulating a coolant flow through the coolant flow regulated heat exchanger responsive to the temperature control command thereby forming the temperature regulated stream.

19. The method of claim 14 wherein the control command is the temperature control command, the means for limiting receiving vessel gas temperature during dispensing is a valve array, and the regulated stream is a temperature regulated stream, the method further comprising:
    selectively passing the hydrogen-containing feed stream to a heat exchanger via the valve array responsive to the temperature control command thereby forming the temperature regulated stream.

20. The method of claim 14 wherein the control command is the pressure control command, the means for limiting receiving vessel gas temperature during dispensing is a valve array, and the regulated stream is a pressure regulated stream, the method further comprising:
  selectively passing the hydrogen-containing feed stream through at least three gas transmission lines responsive to the pressure ramp rate control command.

21. The method of claim 14 wherein the control command is the temperature control command, the means for limiting receiving vessel gas temperature during dispensing is a multi-way valve, and the regulated stream is a temperature regulated stream, the method further comprising:
  passing a second hydrogen-containing feed stream having a second temperature different from the first temperature to the multi-way valve; and
  regulating the hydrogen-containing feed stream and the second hydrogen-containing feed stream via the multi-way valve responsive to the temperature control command thereby forming the temperature regulated stream.

22. The method of claim 21 wherein the second temperature is at least 30 Celsius degrees less than the first temperature.

* * * * *